Nov. 6, 1962 B. A. SCHWARZ 3,062,552

DISK RECORD ENCLOSURE

Filed March 11, 1959 2 Sheets-Sheet 1

INVENTOR.
Bertram A. Schwarz
BY
Robert E. Fowler
ATTORNEY

INVENTOR.
Bertram A. Schwarz
BY
Robert C. Fowler
ATTORNEY

United States Patent Office 3,062,552
Patented Nov. 6, 1962

3,062,552
DISK RECORD ENCLOSURE

Bertram A. Schwarz, Kokomo, Ind., assignor to General Motors Corporation, Detroit, Mich., a corporation of Delaware Filed Mar. 11, 1959, Ser. No. 798,696
5 Claims. (Cl. 274—1)

This invention relates to protective enclosure means and more particularly to protective enclosure means for housing records containing sound recordings.

At the present time disk records upon which certain recordings have been made are expensive and to a degree fragile for so-called "high fidelity" reproduction. If these records are not carefully handled and stored, a few playings may injure the sound grooves so as to spoil the clear playback qualities. Currently, disk records are conventionally sold in square paper or plastic containers into which they are inserted from one side and stored between playings. However, they have to be removed from these enclosures for use on the turntables and then replaced for storage. Often also while the record is in use on the turntable, some object may inadvertently fall on the surface to chip or make it unusable.

It is, therefore, an object in making my invention to provide a permanent housing for a disk record once it has been recorded from which it need not be removed for reproduction.

It is a further object in making this invention to provide a permanent housing for a disk record that is light, compact and will protect the disk record at all times including during reproduction.

With these and other objects in view, which will become apparent as the specification proceeds, my invention will be best understood by reference to the following specification and claims and the illustration of the accompanying drawing in which:

Figure 1:
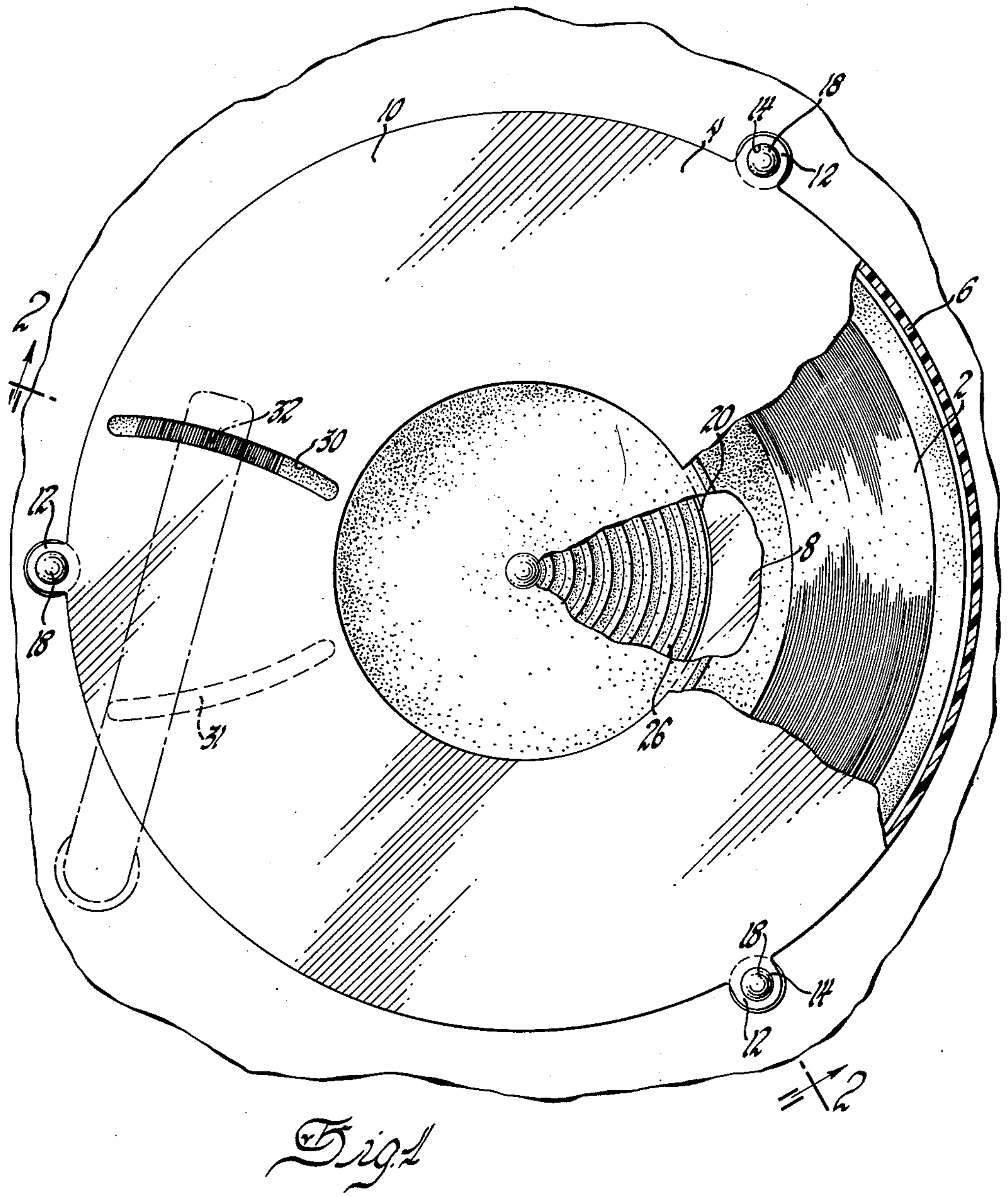
FIGURE 1 is a top plan view of my enclosure including a record supported on a turntable with parts being broken away and shown in section to illsutrate different portions of the assembly.
Figure 2:
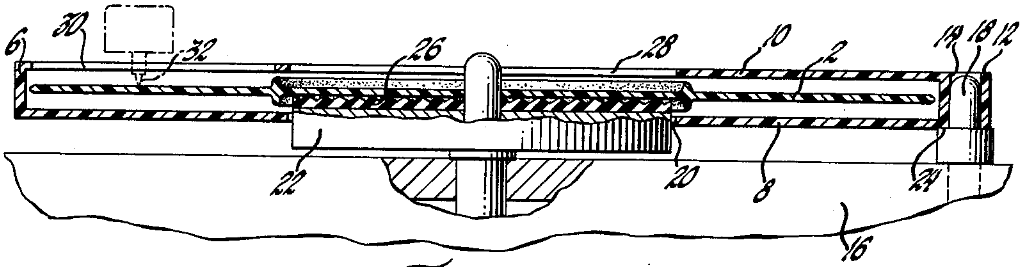
FIGURE 2 is a sectional view taken on line 2—2 of FIGURE 1.

Referring now more particularly to the drawings there is shown therein a record 2 which may bear any desired recording. This record is housed in a circular enclosure or housing 4 which may be made of any desired materials such as paper, cardboard, plastic and so forth. This housing is cylindrical having an outer cylindrical wall 6 of short axial length and a back plate 8 and front plate 10. At certain desired points on the periphery of this cylindrical casing there are provided anchoring ears 12 each having a central opening 14 therein. In the illustration shown in FIGURE 1, three of these peripherally spaced ears are provided for the purpose of locking the cylindrical housing from rotation when the record is being reproduced.

The record player casing 16 is provided with indexing pins 18 which project into the openings 14 when the record housing is placed on the player. Both the back plate 8 and the front plate 10 have a central opening 20 and 28, respectively, therein slightly larger than the diameter of the turntable 22 of the player. Thus when the record housing or assembly is placed on the player, it will be supported by the shoulders 24 on the pins 18 and the upper face of the turntable 22 will force the record 2 up into an intermediate position between the front and back plates 10 and 8 within the housing so that it is free to turn. In order to supply sufficient driving friction, a layer of any suitable frictional material 26, such as sponge rubber, emery cloth and so forth, may be applied to the upper surface of turntable 22 and support the record as it is forced upwardly in the housing. The front plate 10, as well as having a central circular opening 28 therein through which the central part of the record may be viewed to ascertain the identity of the recording, also has an arcuate slot 30 through which the reproducing stylus 32 may project to engage the actual recorded grooves.

To apply one of these permanently enclosed records to a turntable, the operator merely selects one from a stock, places the housing so that each of the ears 12 are in alignment with one of the registering pins 18 and lowers the same to the proper position. This action brings the frictional face 26 of the turntable up to engage the central portion of the record 2 and to support the record in an intermediate position within its housing so that it may rotate freely. The reproducing stylus 32 may then be moved over to proper position at the beginning of the grooves and the turntable started. After the record has been played, it is only necessary to replace in storage to remove the reproducing arm by swinging it out of the way, then remove the record housing 4 and replace the record and its housing in storage. If the other side of the record is to be played the housing can be inverted fitting the opening 28 over the turntable and dropping the stylus through arcuate slot 31 in plate 8.

Figure 3:
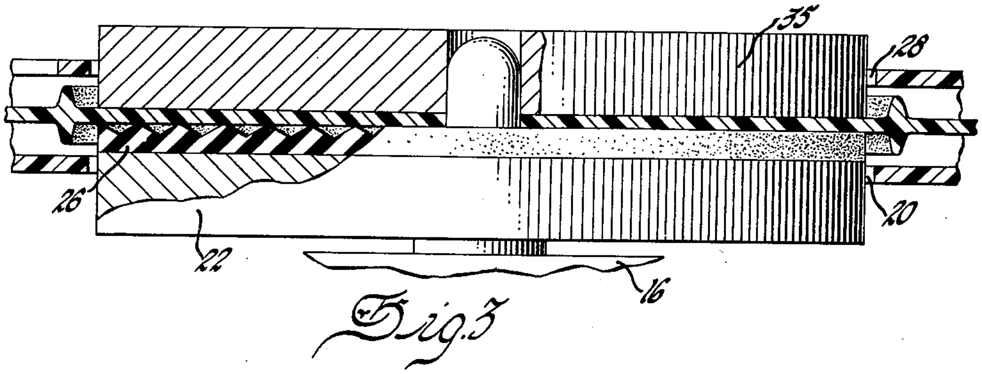
FIGURE 3 is an enlarged sectional view of the center turntable supporting portion showing the record in place; and, FIGURE 4 is a view similar to FIGURE 3 showing a modified form of means for locking the record to the turntable for reproduction.

If there is insufficient friction between the record and turntable and undesired skipping occurs an extra weight such as 35 in FIGURE 3 may be placed on the record center to prevent skipping.

Figure 4:
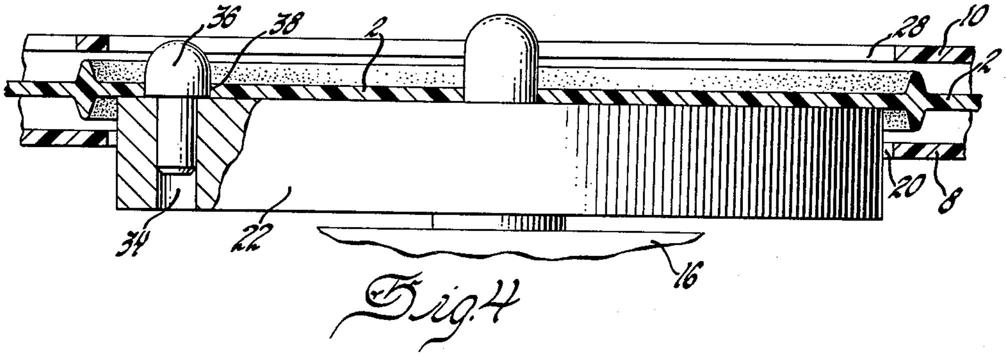

As an alternative means of locking the record to the turntable, instead of having a frictional face 26 of the upper face of the turntable 22, FIGURE 4 illustrates that the record may be locked to the turntable by the provision of an indexing opening 34 in the turntable through which a locking pin 36 may be inserted through registering opening 38 in the record 2 which, of course, will mechanically lock the record for turning with the turntable when the pin 36 is dropped into position.

With this type of housing or casing, the expensive high fidelity records of the present day may be adequately protected at all times against injury including times of usage and it will also avoid the necessity of searching for a temporary housing in which to replace the record once it has been played, as is necessary at present.

What I claim is:

1. In a device of the class described, a disk upon the flat surfaces of which sound recordings have been inscribed, a hollow casing housing said disk of such interior dimensions that the disk may assume a central position therein and move freely without engaging the inner surface, said hollow casing having an opening therein through which a driving member may project to engage the disk and move it axially with respect to the hollow casing to free it from any contact with said casing for rotation, said casing also having an arcuate slot therein through which a reproducing stylus may project and engage the recorded surface while the disk is being driven.

2. In a device of the class described, a disk upon the flat surfaces of which sound recordings have been inscribed, a hollow casing housing said disk of such interior dimensions that the disk may assume a central position therein and move freely without engaging the inner surface, said hollow casing having an opening therein through which a driving member may project to engage the disk and move it axially with respect to the hollow casing to free it from any contact with said casing for rotation, said casing also having an arcuate slot therein through which a reproducing stylus may project and engage the recorded surface while the disk is being driven, and locking means on said casing to hold the casing from moving when the disk is being driven.

3. In reproducing equipment, a permanent housing for a disk record having recorded material on its opposite faces, said housing having a central opening in each opposite face of sufficient size to allow a turntable to pass freely through and engage the record within to drive the same, said housing being of sufficient axial length to permit the record housed therein to move and in an intermediate position be free of any engagement with said interior surface of the housing, and said housing being provided with arcuate slots in each face through which a stylus may project to engage the record for reproducing the recorded material so that the record need not be removed from the housing for purposes of reproduction.

4. In reproducing equipment, a permanent housing for a disk record having recorded material on its opposite faces, said housing having a central opening in each opposite face of sufficient size to allow a turntable to pass freely through and engage the record within to drive the same, said housing being of sufficient axial length to permit the record housed therein to move and in an intermediate position be free of any engagement with said interior surface of the housing, and said housing being provided with arcuate slots in each face through which a stylus may project to engage the record for reproducing the recorded material so that the record need not be removed from the housing for purposes of reproduction, and means on said housing for engaging stationary areas to keep the housing from moving when the disk record is being driven.

5. In reproducing equipment, a permanent housing for a disk record having recorded material on its opposite faces, said housing having a central opening in each opposite face of sufficient size to allow a turntable to pass freely through and engage the record within to drive the same, said housing being of sufficient axial length to permit the record housed therein to move and in an intermediate position be free of any engagement with said interior surface of the housing and said housing being provided with arcuate slots in each face through which a stylus may project to engage the record for reproducing the recorded material so that the record need not be removed from the housing for purposes of reproduction, and a plurality of arcuately spaced hollow ears on said housing through which stationary members may be inserted to keep the housing from rotating when the disk record is being reproduced.

References Cited in the file of this patent

UNITED STATES PATENTS

| | | |
|---|---|---|
| 1,468,879 | Emerson | Sept. 25, 1923 |
| 1,766,046 | Prescott et al. | June 24, 1930 |
| 2,712,448 | Schroter | July 5, 1955 |
| 2,847,905 | Novak | Aug. 19, 1958 |
| 2,881,004 | Hahn | Apr. 7, 1959 |
| 2,961,922 | Schwartz et al. | Nov. 29, 1960 |

FOREIGN PATENTS

| | | |
|---|---|---|
| 54,490 | France (Addition to No. 902,750) | May 2, 1950 |
| 246,720 | Switzerland | Oct. 1, 1947 |